(12) United States Patent
van de Graaf et al.

(10) Patent No.: US 7,320,719 B2
(45) Date of Patent: Jan. 22, 2008

(54) FILTER DEVICE METHOD OF MANUFACTURING THE SAME AND METHOD OF REPLACING A FILTER DEVICE

(75) Inventors: Peter van de Graaf, Sevenum (NL); Johannes Valkenburg, Herten (NL)

(73) Assignee: 3M Innovative Properties Company, St. Paul, MN (US)

(*) Notice: Subject to any disclaimer, the term of this patent is extended or adjusted under 35 U.S.C. 154(b) by 340 days.

(21) Appl. No.: 10/504,494

(22) PCT Filed: Feb. 5, 2003

(86) PCT No.: PCT/US03/03377

§ 371 (c)(1),
(2), (4) Date: Aug. 12, 2004

(87) PCT Pub. No.: WO03/069234

PCT Pub. Date: Aug. 21, 2003

(65) Prior Publication Data
US 2005/0161387 A1   Jul. 28, 2005

(30) Foreign Application Priority Data
Feb. 13, 2002   (EP) ................................. 02003125

(51) Int. Cl.
*A47L 9/10* (2006.01)
(52) U.S. Cl. .................. 55/429; 55/385.1; 55/359; 55/473; 55/490; 55/DIG. 3; 15/347; 15/352
(58) Field of Classification Search ............... 55/385.1, 55/429, 359, DIG. 3, 473, 490; 15/347, 15/352

See application file for complete search history.

(56) References Cited

U.S. PATENT DOCUMENTS 2,892,511 A * 6/1959 Gall et al. ..................... 55/357

(Continued)

FOREIGN PATENT DOCUMENTS

DE          41 19 503 A1       12/1992

(Continued)

*Primary Examiner*—Duane Smith
*Assistant Examiner*—Minh-Chau T. Pham
(74) *Attorney, Agent, or Firm*—Dena M. Ehrich; C. Michael Geise

(57) ABSTRACT

A filter device adapted for filtering fluids flowing one of into or out of a fluid duct. In one embodiment, the filter device comprises a container having one or more walls, wherein at least one of the walls is at least partially rigid and a first opening and a filter element mounted in the first opening so that the filter element forms at least a portion of one of the walls. The one or more container and the interior face of the filter element define an interior adapted for collecting contaminants in a fluid flowing out of the fluid duct. The container further comprises a second opening adapted for sealingly and removably connecting the filter device to the fluid duct so as to provide fluid communication between the interior of the filter device and the fluid duct, wherein the second opening is further adapted for being closed when the filter device is removed from the fluid duct. In another embodiment, the filter device comprises a container formed of first and second integral parts sealingly joined together, wherein the container comprises at least one cut-out first opening with a filter element mounted in the cut-out and a second opening for fluid communication with the fluid duct, and wherein the second opening has a first portion that is at least partially defined by the first integral part and a second portion that is at least partially defined by the second integral part. Methods of replacing a filter device and methods of making a filter device are also disclosed.

15 Claims, 9 Drawing Sheets

U.S. PATENT DOCUMENTS

| | | | |
|---|---|---|---|
| 3,668,736 A * | 6/1972 | Loscalzo | 15/402 |
| 3,732,667 A * | 5/1973 | Fromknecht et al. | 55/373 |
| 3,838,556 A | 10/1974 | Finger | |
| 4,692,177 A | 9/1987 | Wright et al. | |
| 4,745,654 A * | 5/1988 | Yamamoto et al. | 15/344 |
| 5,230,800 A | 7/1993 | Nelson | |
| 5,685,887 A | 11/1997 | Mochida | |
| 5,778,487 A * | 7/1998 | Schuld | 15/352 |
| 5,792,228 A | 8/1998 | Fath et al. | |
| 5,792,242 A | 8/1998 | Haskett | |
| 6,256,834 B1 * | 7/2001 | Meijer et al. | 15/352 |
| 6,261,342 B1 | 7/2001 | Rousseau et al. | |
| 6,393,656 B1 * | 5/2002 | Paterson et al. | 15/327.5 |
| 6,406,508 B1 * | 6/2002 | Bloomer | 55/385.3 |
| 6,618,898 B2 * | 9/2003 | Tingle | 15/347 |
| 6,775,882 B2 * | 8/2004 | Murphy et al. | 15/352 |
| 2004/0093684 A1 * | 5/2004 | Park | 15/327.1 |
| 2004/0148914 A1 * | 8/2004 | Lim et al. | 55/429 |

FOREIGN PATENT DOCUMENTS

| | | |
|---|---|---|
| DE | 43 08 399 A1 | 9/1994 |
| DE | 197 00 340 A1 | 7/1998 |
| EP | 0 441 045 | 8/1991 |
| EP | 0 442 856 A1 | 8/1991 |
| EP | 0 649 335 B1 | 4/1995 |
| EP | 0 838 639 A1 | 4/1998 |
| EP | 0 961 088 A2 | 5/1998 |
| EP | 1 068 889 A1 | 1/2001 |
| EP | 1 302 726 | 4/2003 |
| GB | 2 356 359 | 5/2001 |
| WO | WO 81/01109 | 4/1981 |
| WO | WO 95/05232 | 2/1995 |
| WO | WO 95/34367 | 12/1995 |
| WO | WO 98/20961 | 5/1998 |

\* cited by examiner

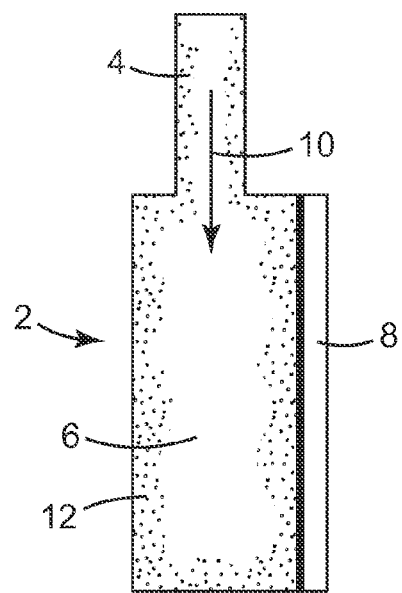
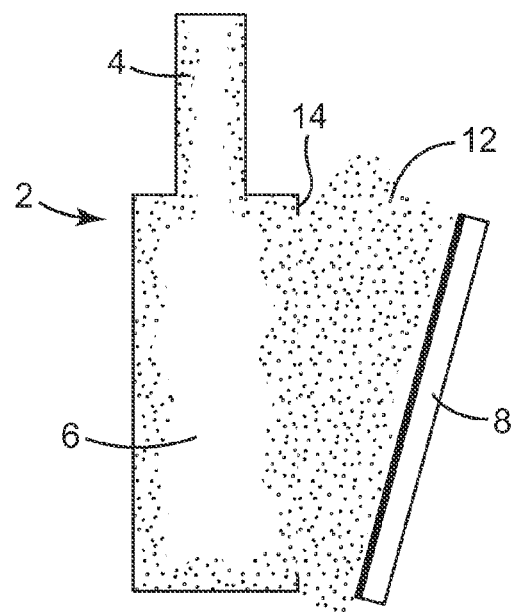
FIG. 1a
(Prior Art)
FIG. 1b
(Prior Art)
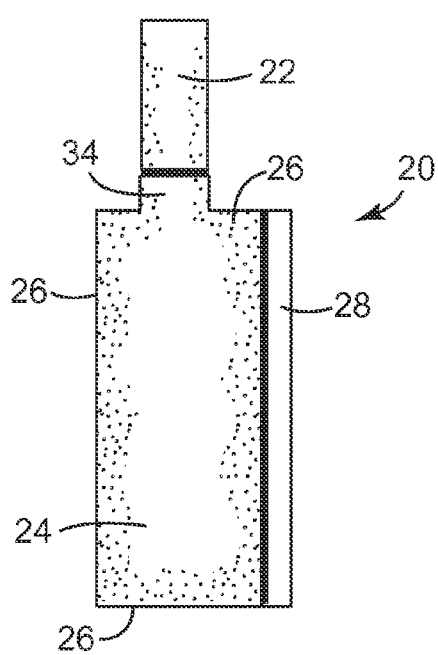
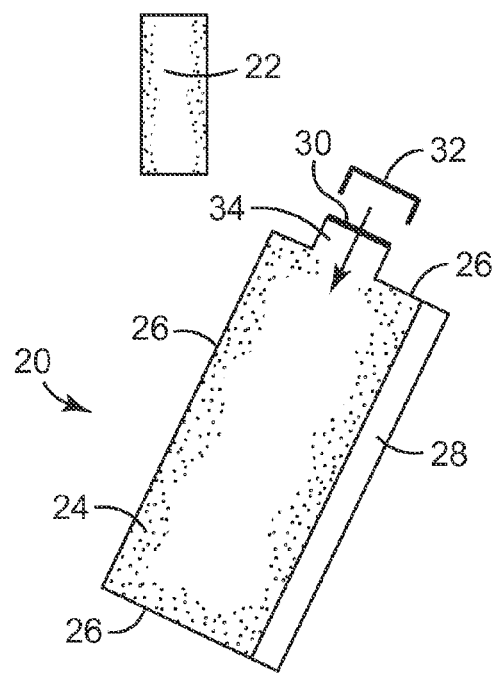
FIG. 2a
FIG. 2b

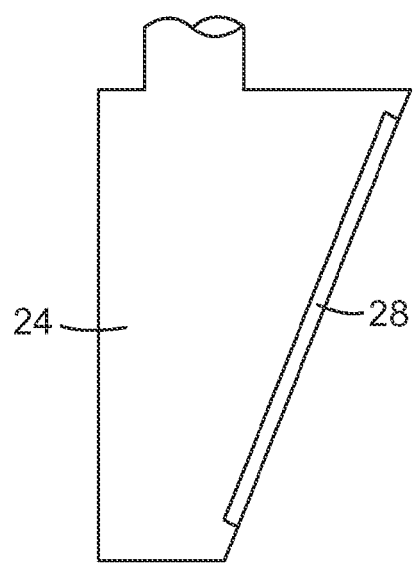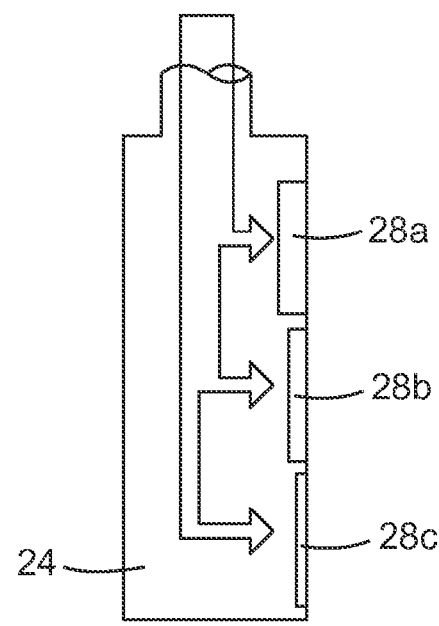
FIG. 6a  FIG. 6b
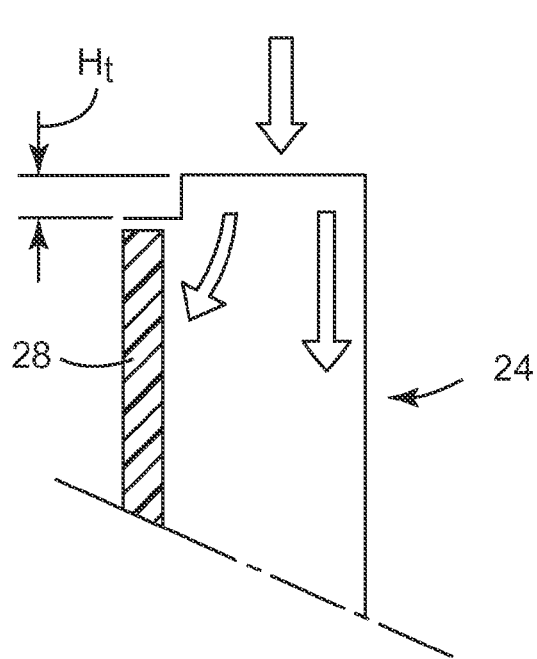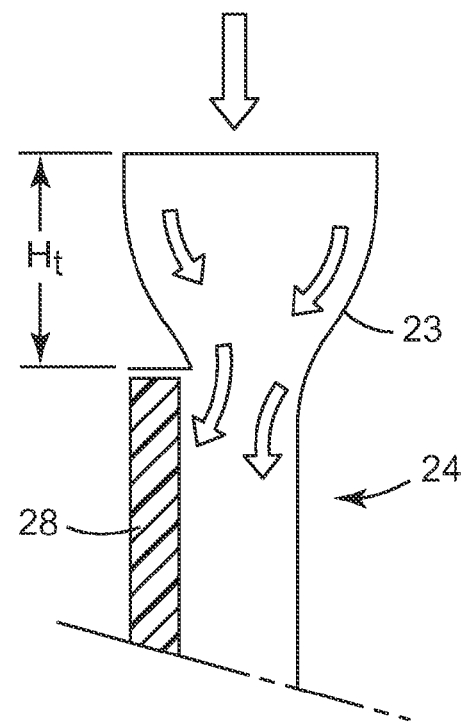
FIG. 7a  FIG. 7b

FILTER DEVICE METHOD OF MANUFACTURING THE SAME AND METHOD OF REPLACING A FILTER DEVICE

FIELD OF THE INVENTION

The present invention generally relates to a supply and/or exhaust system for air terminal devices (ATD) comprising a housing carrying a filter through which air is released into and/or removed from, e.g., a building, a room, cabins, enclosures etc., where human beings, animals, sensitive products, or equipment may be present. In such systems air is preferably partially received from and returned to a central air supply which takes air from the environment or outside, e.g., of a building.

TECHNICAL BACKGROUND

Usually, fresh air supply for a room in a building will be provided by air taken from the outside of the building. The amount of relatively course impurities and/or contaminants will be reduced to prevent damage to the air supply system. In one or more further steps the air will be treated in a way to reduce fine impurities to achieve the air quality for the intended use of the rooms in a building.

Typically, such air handling units (AHU) and duct work systems may itself act as a source for impurities of the air provided to a room. These impurities could be caused by production process residues (e.g., oil), contamination during construction and/or deposited impurities during use. All these impurities can additionally cause the growth of organisms which again cause further impurities of the air supplied to the room. Moreover, the air exhausted from a room generally passes a filter or other means for removing impurities as well to prevent contamination of the duct system. One of the causes of air quality problems which even can result in the so-called sick building syndrome are impurities in the air in rooms. The air handling system has therefore generally to be designed, maintained and operated such that impurities from outdoors as well as indoors are appropriately considered. Otherwise, such contaminates could contribute to these air quality problems.

In case of centralised systems the reduction of impurities will be the same for every room in the building, which is practically often not necessary or useful. The purpose of each room can be very different, e.g., in hospitals. Accordingly, such centralised systems will suffer from the disadvantage that the same quality of the incoming air for rooms with different purposes is provided, which means some rooms might not require the air quality provided by the central air handling unit, whereas other rooms might need higher qualities of air than provided by the air handling unit because of its particular purpose.

Thus, systems have been established recently comprising filter units for each room depending on its respective air quality requirements, wherein the incoming air is provided by a central air handling unit. This unit will remove relatively coarse impurities from the air sucked in to avoid damages or clogging of the air distributing system, e.g., pipework, splitting units etc. This pre-filtered air is then distributed to each room and the final cleaning process takes place in each of these rooms. This allows for adapting each of the filter units in a way addressing the specific demand of each room.

Generally, the working principle of air terminal devices is based on the so-called displacement ventilation system, i.e. relatively cool air is introduced into the room preferably at the floor level with a low velocity. By encountering a heat source, e.g., human beings, room equipment etc. the introduced air raises and carries gaseous and partially particulate contamination out of the occupied zone while fresh cooler air is introduced into this zone simultaneously.

A plurality of conventional air terminal devices are known in the art. For example, DE 41 19 503 C2 relates to an apparatus for circulating air into a room. The apparatus comprises a housing with relatively large openings for introducing the air stream into the apparatus and exhausting it therefrom. The openings are covered with perforated plates, a grid or mesh that can be easily removed. Between the back side of the perforated plate, grid or mesh and the respective opening a thin layer dust filter is exchangeably provided. In order to exchange the filter the perforated plate, grid or mesh is removed from the housing and the filter material is exchanged whereupon the apparatus is closed again.

EP 0 838 639 A1 discloses an apparatus for installing a ventilation van preventing dust, gas or the like from coming into a room. The apparatus comprises a L-shaped housing for fixing a ventilation van therein. The housing has an inside opening positioned inside a wall and an outside opening which looks down and is positioned outside the wall. The inside opening is provided with an exhaust filter being able to slide vertically so that it can be removed from the housing. Further, the inside opening is covered with a metallic lid which can be opened or closed. A further filter for absorbed air is provided near the outside opening. Both filters can be exchanged by removing the filter cassette, replacing the filter within the filter cassette with a new one and inserting the filter cassette again into the apparatus.

GB 2 356 359 A discloses an air return register forming part of an air recalculation system. This device comprises a casing, a filter element, a fresh air inlet and air vents. Fresh air is drawn into the casing to the inlet, passes through the filter element and out through the vents. Below the register the fresh air mixes with existing air for recirculation. The air then passes through vents into the casing, through the filter element on the other side of a separating wall and out through outlets which are connected to air distribution units. To replace the filter element, a latch is undone and the bottom frame of the casing is pivoted about a hinge to provide access.

WO 81/01109 A1 discloses a housing for mounting HEPA filters including an open-ended tubular casing and, within the casing, a slide structure for slidably mounting the HEPA filter therein from one of the ends of the casing. A buffer means divides the interior of the casing into respective chambers which, on mounting of the filter in the slide structure, are gas-tightly isolated from each other except by way of the filter and which are accessible for a respective one of the open ends of the casing. Also provided are gas intake/exhaust ports for each of the chambers, a pair of cover members for closing the respective open ends of the casing, each of which cover members includes a flange complementary to the associated end of the casing, and respective clamp and seal means for clamping the cover members to the casing to effect a gas-tight engagement of the flange with the respective ends of the casing.

A further example of an air supply terminal device is described in EP 0 961 088 A2. More precisely, this device is a low-velocity supply air terminal device intended for use in rooms that require an air supply, and comprises an inlet which can be connected to an external supply air duct, an air distributing unit for distributing exiting supply air to the room, and an inner space which is open to the inlet and extends in the longitudinal direction of the device from the inlet to its bottom for transporting and distributing air to the air distributing unit. This space is delimited laterally by an inner air permeable wall of the air distribution unit and, when applicable, also by an outer wall of the device. The device also includes a perforated plate for throttling the flow of supply air. The perforator plate is intended to favour distribution of the supply air vertically and uniformly to the air distribution unit arranged in the form of a distribution plate in the inner space. However, no filter is used in this air terminal device.

Similarly, EP 0 442 856 A1 discloses a supply air terminal device with a casing having a perforated front cover through which air exits into a room and a distribution chamber formed within the casing and intended to receive air from a supply channel. The distribution chamber comprises a wall provided with openings and functioning to release air from the distribution chamber in a divergent flow pattern. The wall is disposed in a direction parallel with the air delivered from the channel and has mutually parallel zones which extend along the direction and which include first zones having openings configured to release air completely rearwards in relation to the flow direction of the air supplied through the channel, and second zones having openings configured to release air substantially perpendicular to this direction. This air terminal device does not comprise a filter.

DE 197 00 340 A1 relates to a filter with a filter frame holding a filter element which is preferably made of an active carbon loaded carrier element. The filter frame is made of a closed cell heat-formable foam material, preferably by vacuum forming. To this end a foam web is initially used to provide a filter frame with an integral bottom or bottom portion that is removed in a second step after the forming process so as to provide a frame in which the filter element can be inserted. Further constructions of filter frames are described, for example, in WO 95/34367 A1, WO 98/20961 A1 and DE 43 08 399 C2.

Furthermore, various vacuum cleaners are known, like e.g. the Dyson™-type vacuum cleaners, that use filter cartridges with HEPA filter materials.

These known filter systems are still not considered satisfactory, particularly for applications with a high demand of protection from impurities, since the exchange of a filter is typically cumbersome and involved with a plurality of handling steps during which typically at least a certain amount of impurities caught by the filter element is released into the environment, thus affecting the overall efficiency of the filter system.

In view of a careful balance of pressure drop and the risk of contaminating the air with already captured impurities in the filters, it is necessary to exchange filters from time to time. Since filters capture contaminants from the air stream which are then stored within a filter medium or media, the pressure drop increases for a specific nominal flow rate after extended usage of the filter. This results in higher power consumption and corresponding costs and eventually may lead to a situation where the ventilation system can not overcome the pressure drop so that the room will no more be provided with fresh air. Furthermore, as already mentioned, there is the risk that the impurities already captured within the filter constitute a potential basis for further impurities of the air, e.g., where they support the growth of microorganisms. It is therefore important to remove these impurities from the air stream in certain intervals, i.e. the filter needs to be exchanged.

With common high quality filters exchange often takes place only after three to five years in which such secondary impurities may already have been emitted extensively. Accordingly, filter exchange should be done typically in an order of one year or even at shorter intervals depending on the required air quality. However, filter exchange is typically quite cumbersome and involves a plurality of handling steps, and additionally the risk of further contamination by contaminants trapped in the filter element and released during exchange of the filter element.

More precisely, in order to exchange a filter it is typically necessary to open a filter housing or to remove a cover so as to get access to the filter element After having access to the filter element, it is taken out of the filter unit and replaced by a new one. Afterwards, the housing is closed again. During this operation it is likely that impurities and contaminants collected by the filter during its use release from the filter element and contaminate the room. This means that a filter exchange in a sensitive room, e.g., in an intensive care unit, could prevent the room from being further used prior to cleaning and decontamination. This once more needs additional time and involves costs and leads to an extended period within which the room cannot be used. This is particularly true in order to meet the quality standards (hygienic standards) existing for specific rooms.

SUMMARY OF THE INVENTION

It is an object of the present invention to provide an improved filter device overcoming the problems of the prior art, in particularly the problem of release of impurities and contaminants during filter exchange. It is a further object of the invention to provide an improved method of replacing a filter device as well as an improved method of manufacturing a filter device at low cost. These objects are achieved with the features of the claims.

Generally, the basic idea of the invention is to provide a filter device including a filter housing arranged in such a way that the impurities and contaminants are securely kept within the filter unit. This is achieved by the specific design of the filter housing which allows for encapsulating the filter media on the one hand and capping the air inlet/outlet of the housing on the other hand. Consequently, any inadvertent escape of impurities and the accompanying potential contamination of a room can be avoided.

More precisely, the filter device of the present invention is adapted for filtering fluids flowing into or out of a fluid duct, wherein the filter device comprises a container having one or more walls, at least one of the walls comprising at least one filter element forming at least a portion of the wall. The container defines an interior adapted for collecting contaminated fluid and/or particles contained in the fluid, and the container comprises one or more openings and means adapted for sealingly and removably connecting the filter device to the fluid duct at at least one of the openings so as to provide fluid communication between the interior of the filter device and the fluid duct. The openings are further adapted for being closed and/or comprise means for closing the openings when the filter device is removed from the fluid duct.

At least a part of the container walls may be flexible. However, the container walls are preferably at least partially rigid to form at least one frame for holding the filter element. The one or more openings and the filter element are typically arranged in the container such that the fluid flow into the filter device and the fluid flow out of the filter device are substantially non-parallel. More typically, the angle defined between the fluid flow into the filter device and the fluid flow out of the filter device is preferably in the range of about 70 to 110 degrees, more preferably about 90 degrees, with respect to one another.

In a preferred embodiment, the filter device comprises means for influencing the fluid flow characteristics by changing the geometry of the filter device, the container and/or filter element Furthermore, at least a part of the container may be curved and may have one or more radii. Moreover, at least a part of the at least one filter element may be curved and may have one or more radii. More specifically, the filter element(s) and/or the container may be curved concavely or convexly. For example, the container may be substantially cylindrical, wherein the cross section of the container can be substantially a segment or a sector of a circle. Furthermore, the shape of the container may be substantially frusto-conical.

It is preferred that the filter element(s) cover or extend along a substantial portion of the container, for example substantially the entire circumference thereof. Advantageously, the at least one filter element is a pleated filter element. With such a pleated filter element the effective surface area of the filter element may be increased. For example, at least a part of the walls of the filter device may be formed by a pleated filter material. Alternatively and/or additionally, at least a part of the walls of the filter device may be made of a plane filter material. It may also be preferred to provide the pleated filter element in a curved configuration such that the pleats function as nozzles for directing the fluid flow.

Generally, the filter elements used in the present invention may be made of any suitable filter material. In accordance with a preferred embodiment of the invention, this filter material fulfils the ULPA (ultra low penetration air), HEPA (high efficiency particulate air) and/or fine filter class standards. Typically the material of the at least one filter element is a plastic material, preferably a non-woven material, such as a melt-blown or split-fiber material. More preferably, the filter material is electrostatically charged. One particularly preferred filter material is a non-woven, melt blown (or split-fibre) electrostatically charged plastic material having a low pressure drop. The plastic material may be a polyolefin, preferably polypropylene or polyethylene.

The container may be made of any suitable plastic material, e.g., PET. Most preferably, the container is thermoformed so as to simplify manufacturing and reduce production costs. Typically, the container is generally in the form of a blister package.

According to the invention, the blister-type housing is thermoformed as a wide variety of consumer and commercial products nowadays. In these processes, sheets of a thermoplastic material are heated to its softening point, formed by low pressure into a mould, cooled and die cut from the sheet. All thermoplastic resin that can be processed into a sheet can generally be thermoformed, provided that the heat strength capability of the materials used allow for the application of the required amount of heat.

Possible materials for thermoforming processes are, e.g., polyethylene terephthalate (PET) and polyethylene (PE). The preferred materials are PET and PE due to the advantageous material properties.

The advantages of thermoforming over other thermoplastic moulding or forming processes, i.a., the possibility of forming large surface parts at relatively low mould and equipment costs, forming of very thin-walled parts and production of high volume thin-walled products. Furthermore, only relatively low pressure is required and even heavy-gauge products or parts thereof can be formed.

In one embodiment, the present invention provides a filter device adapted for filtering fluids flowing one of into or out of a fluid duct, wherein the filter device comprises a container formed of first and second integral parts sealingly joined together. The container comprises at least one cut-out first opening and a filter element mounted in said cut-out, and a second opening for fluid communication with said fluid duct. The second opening is one of an inlet opening or an outlet opening. The second opening has a first portion that is at least partially defined by the first integral part and a second portion that is at least partially defined by the second integral part.

Production rates for thermoforming are in the range above 1100 kg/h of trimmed product, provided that improved sheet temperature control, faster forming and cooling as well as trim-speed increases are observed.

The thermoforming system used in the present invention is preferably a vacuum-forming system comprising a mould, which defines the product to be manufactured. In the basic vacuum-forming process the plastic sheet is clamped, heated and sealed against the surface of the mould. The female mould cavity has numerous vent holes leading to a vacuum chamber. Atmospheric pressure forces the sheet against the mould cavity because of the exhaustion of the mould cavity by application of a vacuum. The formed sheet hardens and cools due to the contact with the mould surface (usually consisting of aluminium), wherein the mould is temperature-controlled by circulating water or other coolants through the mould. In particular, thin-walled sheets (substantially in the range of 1.5 mm or less) can be obtained from this process, whereby for higher wall-thickness (particularly using olefin materials) air or mist-spray cooling from the sheet side may be advantageous.

In addition to the use of vacuum only, pressure forming by applying positive air pressure from the opposite side to the vacuum application is also possible. Advantageously, shorter forming cycles through increased cooling by forcing a more intimate contact between sheet and mould surface will be obtained.

The machinery used for thermoforming processes comprises besides the separating and trimming tools particularly the mould. The mould shows the shape of the products to be formed and, moreover sealing means for sealingly connecting the sheet to be formed against the mould as well as cooling means for fixing the formed sheet in that shape by heat removal from the sheet Generally, two types of machines exist. On the one hand sheet-fed machines (cut-sheet thermoformers) and on the other hand machines fed from rolls (continuous web-fed thermoformers), wherein the process selection will be made on the basis of sheet thickness to be handled on a roll as practical limitation rather than the nature of polymer choice. Furthermore, such machines comprise means for indexing or placing the sheet in the heating, forming and trimming areas, means for heating the sheet, a mould to form and cool the product and means for separating or trimming the part from the web.

Cut-sheet thermoformers are used in particular for forming articles with large surface areas and thickness in the range of 1.5 to 6.3 mm. In this process, the sheet to be formed is clamped in a clamping frame and moved into the heating section, or the heating unit is moved over the clamped sheet. The next step is clamping the sheet over the mould, and starting the heating process.

Continuous web-fed thermoformers are particularly suitable for high volume production of disposables and packaging. The raw material will be fed from rolled solid or foam sheet or coupled directly to the output of an extrusion die. Direct in-line extrusion thermoforming may have a single extruder as the continuous sheet source or a battery of extruders in the case of multilayer sheet. Furthermore, means of holding the web at the edges, a method of heating the sheet to forming temperature, a mould contained in a pressure box for vacuum or pressure forming, optional means of assisting the material distribution, and a way of separating the parts from the web are provided.

The means of heating the sheet or web material are typically metal-sheath radiant elements, where tubular heaters are run in the machine direction or transverse (more commonly), placed 5 to 20 cm adjustably above and below the sheet, wherein the sheet is brought to forming temperature in at least two, more commonly three or four heat zones matching the mould length. Moreover, side heaters are providing edge supplement. Alternatively, ceramic heaters as generally preferred heaters for PET and PP providing individual temperature control in the heating oven may be used. Furthermore, convention ovens with precise temperature control of the medium environment heating the sheet may be implemented. However, these ovens are slow due to low thermal coefficient of transfer to the sheet. Contact heating may be used for thinner sheet gauges, wherein air pressure forces the sheet against the heating platen.

The means of indexing usually comprise a chain with sharpened pins, which pierce the sheet prior to the heating station to carry it through the forming cycle. Alternatively, clamping the sheet edges with the clamps carried on chains can also be used.

The thermoforming station brings the mould assembly together, clamps the sheet, provides the assist-plug forming motion, holds the assembly together during thermoforming and supplies a stripping action to eject undercuts formed in the product.

Advantageously, the filter element(s) is/are sealingly connected to the container wall by gluing, welding, clamping, clipping and/or clicking or combinations thereof. More preferably, the filter element is sealingly connected to the container by means of sealing layers, cold adhesive, hot-melt adhesive or ultrasonic welding. It may also be advantageous to use portions of the filter medium itself as sealing material for sealing it against the wall of the container, as generally described in EP 0 649 335 B1 or U.S. Pat. No. 5,792,228.

Furthermore, the container and/or the filter element may be provided with means for sound reduction. The filter device may furthermore comprise at least one gas filter element, preferably an active carbon filter element. Preferably, the filter device is sealingly connected to the fluid duct using sealing means such as an O-ring. It is also preferred that the filter device is adapted for and/or comprises means for covering the filter element when the fluid device is removed from the fluid duct. More preferably, the filter device comprises a lid which may be releasably secured to the container wall for covering at least one of the filter elements. The filter device may also be adapted to be mounted to other identical or similar filter devices. Typically, the fluid flowing through the filter device is air.

In accordance with one embodiment of the present invention, the filter device comprises a plurality of filter elements which are arranged so that a uniform fluid flow and/or pressure balance and/or other desired fluid flow patterns are achieved. For example, two, three or more filter elements with different pressure drop properties and/or permeabilities may be provided above each other in the filter device.

Typically, the filter device of the present invention is used in displacement air terminal devices and/or in displacement ventilation systems.

With the filter device of the present invention, the quality of air in rooms or building spaces can be improved without changing the overall functioning of the central air handling system. Furthermore, the filter device is advantageously disposable, i.e. the filter element with its container may be completely disposed after use. In other words, filter replacement is carried out by replacing the whole filter device so that impurities collected by the filter element and/or in the container will be kept within the filter device. As such, the danger of potential contamination of a room with the impurities or contaminants collected by the filter element can be avoided. The disposable filter device of the present invention may be as cost-effective as a conventional replaceable filter element, since the filter device (i.e. container and filter element) can be manufactured at low cost. This can be achieved, for example, by forming the container or housing of the filter device by means of a vacuum forming process with the use of a plastic material. With this process, a blister-type container can be manufactured with relatively complex shapes while keeping the manufacturing costs comparatively low.

BRIEF DESCRIPTION OF THE DRAWINGS

In the following, preferred embodiments of the filter device of the present invention will be described in connection with the drawings, in which:

FIGS. 1a and 1b is a prior art embodiment of a filter;

FIGS. 2a and 2b is a filter device in accordance with an embodiment of the present invention;

FIG. 6a is a schematic cross-section through the filter device in accordance with one embodiment of the present invention providing a substantially uniform air flow;

FIG. 6b is an alternative embodiment of a filter device of the invention providing a substantially uniform air flow;

FIGS. 7a and 7b show transitions between the fluid duct and the filter device;

DETAILED DESCRIPTION OF THE PREFERRED EMBODIMENTS

Figure 3:
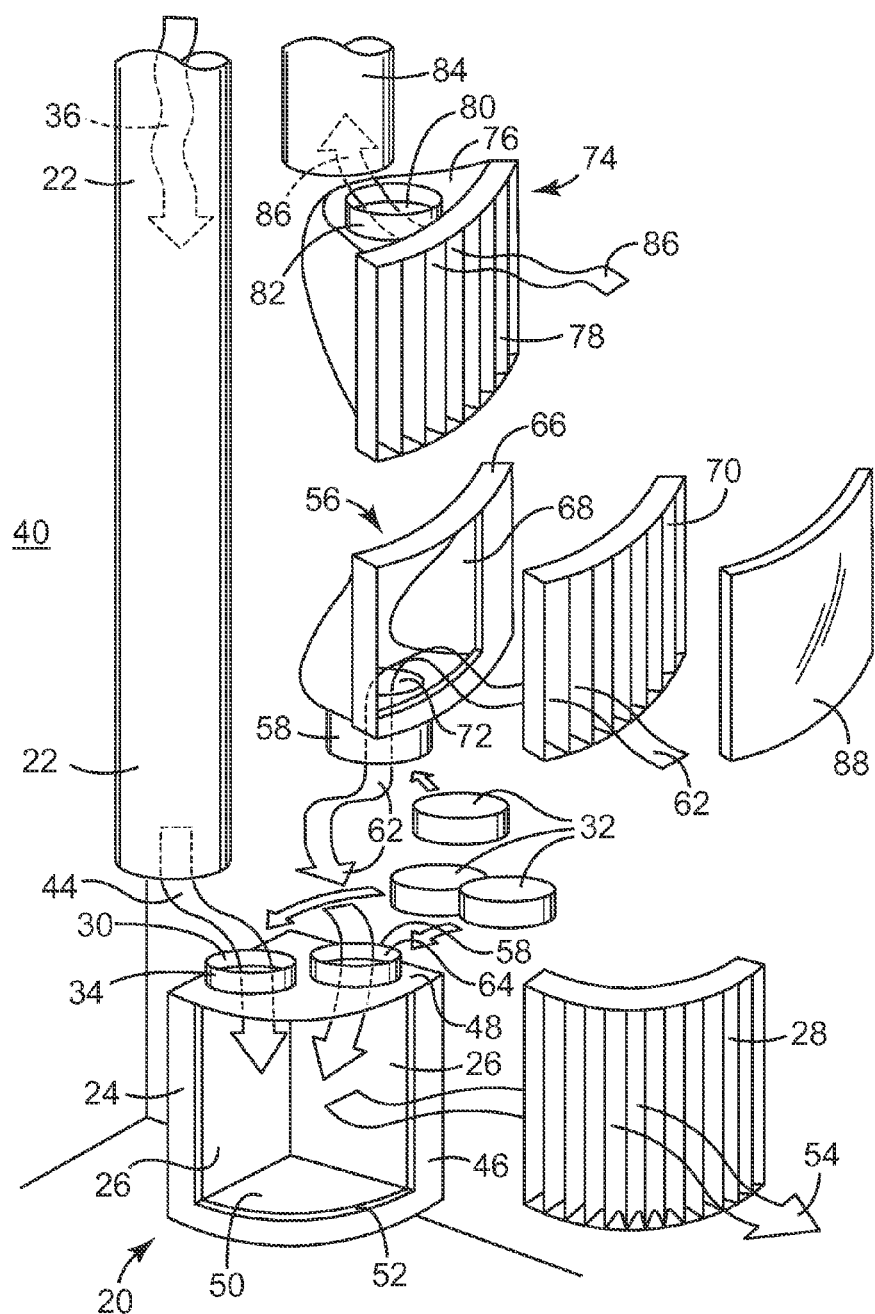
FIGS. 3 and 3a is an exploded view of an air terminal device with a filter device in accordance with one embodiment of the present invention.

In FIG. 1 a prior art filter device 2 is shown which is connected to a fluid duct 4 providing a fluid to be filtered. The filter device 2 comprises a flange or end piece 6 and a filter element or filter medium 8. The filter element 8 is removable from the end piece 6 as shown in FIG. 1b. In FIG. 1a the incoming fluid flow is illustrated by arrow 10 which carries contaminants or impurities 12, e.g., dust particles. After a predetermined life time of the filter element 8 it has to be replaced with a new one. This is typically conducted by removing the filter element 8 from the end piece 6 as illustrated in FIG. 1b. As can be seen, the impurities collected on the inside of the filter element and within the end piece 6 of fluid duct 4 fall out through the opening 14 provided, when the filter element 8 is removed. This causes an undesired contamination of the site, e.g., the room, where the filter device is located since it is particularly intended to keep any impurities out of that site.

In FIG. 2, one embodiment of the filter device 20 of the present invention is illustrated schematically. This filter device 20 is releasably connected at 30 to a fluid duct 22 and is adapted for filtering fluid flowing into or out of the fluid duct 22, wherein in the illustrated embodiment of FIG. 2 the first alternative is illustrated. The filter device 20 substantially comprises a housing or container 24 having one or more walls 26. The walls of the container may be flexible or rigid, or portions of the container may be flexible and other portions may be rigid. Preferably, the container is made from a single material and the rigid and flexible portions of the container are constructed by means of reinforcing ribs or other reinforcing elements which are provided, for example, at least in the region surrounding the circumference of the filter element 28, thus providing a frame for holding the filter element 28 tightly on the container wall 26. Upon removal of the filter after it has reached its predetermined lifetime, the whole filter device 20 is disconnected from the fluid duct 22 and removed there from as illustrated in FIG. 2b. The opening 30 of the container 24, at which the container is connected with the fluid duct 22, is closed after removal from the duct by a suitable means, as is schematically illustrated in FIG. 2b by means of the cap 32. Alternatively, a spring biased flap or any other suitable means may be provided close to the opening 30 or within a flange portion 34 of the container 24.

In FIG. 3, an exemplary supply and exhaust system for an air terminal device (ATD) is schematically illustrated in exploded fashion. This air terminal device comprises a fluid inlet duct 22 already referred to with respect to FIG. 2, through which air from a central air supply is supplied to the filter device 20 of the present invention as indicated by the arrow 36. Typically, the inlet fluid duct 22 may be covered by any suitable means and may be mounted to a wall 40 of a room by any appropriate means. In the illustrated embodiment the air terminal device is mounted in a corner of the room.

At the downstream end portion of the inlet fluid duct 22 a flange (not shown) is provided so that the duct 22 can be mounted to the flange portion 34 of the container 24. Accordingly, the fluid enters the filter device 20 via the opening 30 as shown by arrow 44. As shown in this embodiment, the container 24 comprises two perpendicularly arranged side walls 26, a bent or curved wall portion 46 facing the room to be supplied with air, as well as top and bottom walls 48 and 50. The top and bottom walls 48 and 50 have a quarter-circular shape, so that the curved front wall 46 extends along a quarter of a circle while the two side walls 26 extend along the straight portions of the top and bottom walls, respectively. The front wall 46 comprises a relatively large opening or cut-out 52 in which the filter element 28 is inserted. The filter element 28 itself is also curved so as to conform to the curved or bent shape of the front wall 46 of the container 24.

As illustrated, the filter element 28 may be a pleated filter as is generally known in the art and will be described later. The filter element 28 is tightly inserted and sealingly held in the container 24, so that all of the fluid exhausting from the container 24 is actually filtered. This is indicated in the schematic illustration of FIG. 3 by arrow 54.

The air terminal device shown in FIG. 3 functions as an air displacement system, i.e. the filtered air exits the filter device 20 close to the bottom of the room and then rises due to its increasing temperature so as to be sucked off at a higher location in the room. In the embodiment of FIG. 3 the filtered air may be recirculated from the room by reintroducing it again into the filter device 20 which is located at the bottom of the room. To this end, the container 24 of the filter device 20 is connected to a further filter device 56 through which air is sucked in from the room as indicated by arrow 62. For this purpose, a means for maintaining air ventilation may be provided in a ductwork 58 between the filter devices 20 and 56, if necessary. The top wall 48 of the container 24 comprises a second opening 64 through which the air again enters the first filter device 20 and then exits therefrom through the filter element 28 into the room. The second opening 64 may be provided in the top wall 48 besides the first opening 30, as shown in FIG. 3, but may alternatively also be provided in the bottom wall 50. Similarly as the first filter device 20, the second filter device 56 comprises a housing or container 66 with a wall structure having an opening or cut-out 68 for receiving a filter element 70. Furthermore, the filter device 56 comprises an opening 72 to which the duct 58 is connected for guiding the fluid to the first filter device 20.

At an even higher level in the room, a third filter device 74 is provided for exhausting the air out of the room. The filter device 74 is constructed substantially similar to the second filter device 56, i.e. it comprises a housing or container 76, a filter element 78 and an opening 80 at a flange portion 82 for connecting the filter device 74 to a third exhaust duct 84. The exhausted air stream is indicated by arrow 86 in FIG. 3.

Figure 3A:
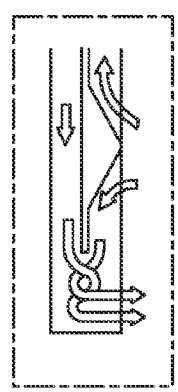

The concept of the function of the air terminal device of the present invention is also briefly shown in FIG. 3a at the left hand side of FIG. 3 in a schematic cross section that is circumscribed by a dotted line. From this illustration it can be seen that the incoming air stream is fed into the first filter device 20, led into the room, recirculated through the second filter device and removed through the third filter device. In other words, the air from the room is partially re-circulated through the second filter device into the first filter device and again introduced into the room before finally leaving it through the third filter device.

In order to remove or replace the filter device 20 of the present invention, it is disconnected from the inlet duct 22 (and duct 58, if present) and may be completely discarded, i.e. the housing 24 together with the filter element 28 is disposed off. In order to ensure that all impurities and contaminants collected by the filter device are safely maintained within the housing, the openings 30 and 64 of the filter device 20 are closed by respective closing means, e.g., caps 32.

With respect to the second and third filter devices 56 and 74 of the present invention, not only the openings 72 and 80 themselves are closed by caps 32, but also the filter elements 70 and 78 are covered with an appropriate lid 88, respectively, as schematically illustrated in FIG. 3 so as to ensure that no impurities and contaminants collected from the incoming air on the outside of the filter elements 70 and 78 become loose and contaminate the room.

Figure 4A:
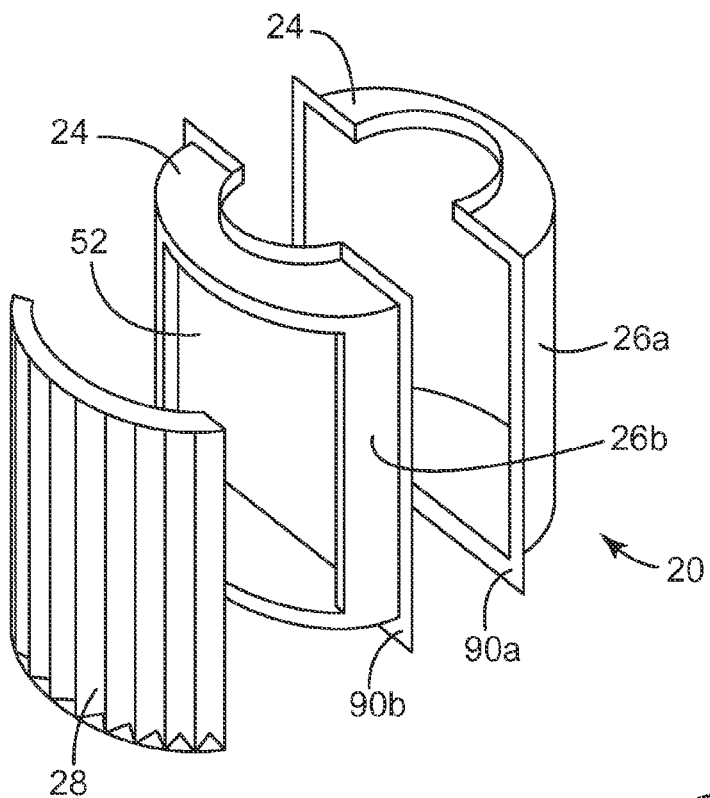
FIGS. 4a to 4c illustrate preferred blister-type embodiments of the filter device of the present invention.
Figure 4B:
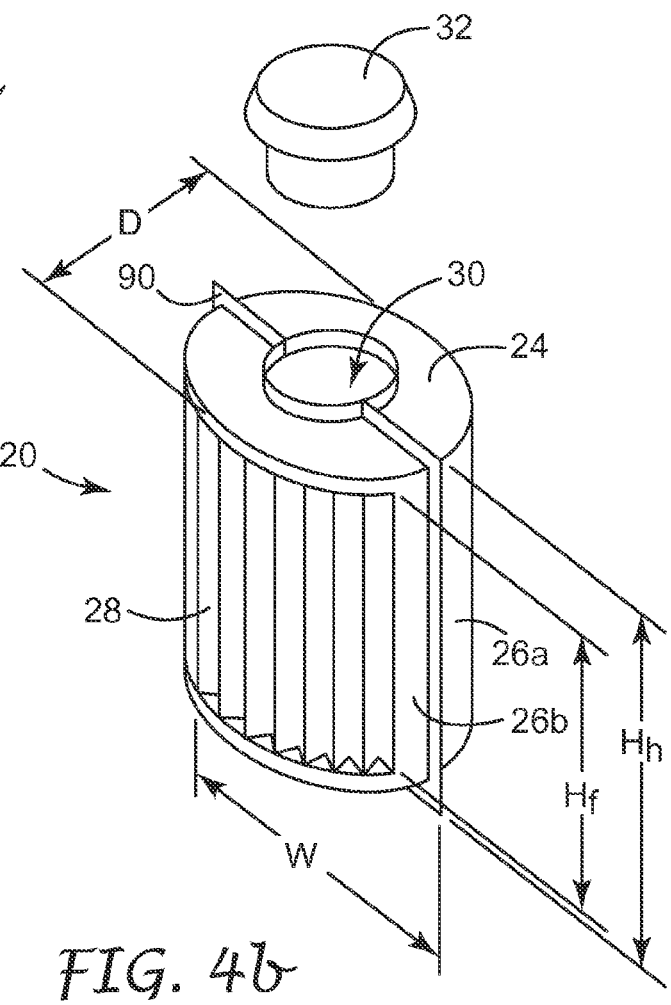

FIGS. 4a and 4b show another preferred embodiment of the filter device 20 of the present invention that may be used in an air terminal device. In accordance with this embodiment the housing 24 is a blister-type housing having a generally semi-circular cross-sectional shape with a rear wall 26a and an opposite front wall 26b. The front and rear walls 26a, 26b are preferably identical to facilitate manufacturing thereof. The front wall 26b has an opening or cut-out 52 which is adapted to receive a filter element 28. The container or housing 24 defines an interior for collecting particles and/or other contaminants contained in the fluid. Besides the cut-out 52, the container 24 comprises at least one opening 30 at which the filter device 20 can be connected to an inlet/outlet duct (not shown). Preferably, the housing 24 is provided with means adapted for sealingly and removably connecting the filter device to the fluid duct. Furthermore, the opening 30 comprises specific means or is otherwise adapted for closing it when the filter device is removed from the fluid duct Although in the embodiment of FIGS. 4a and 4b only one filter element 28 is shown in the front wall 26b of the filter device 20, there could also be a further filter element provided in the rear wall 26a of the device or even a plurality of filter elements may be provided. The filter element 28 may also be provided between the two blister walls 26a, 26b, i.e. it may be sealingly attached to the rear wall 26b and/or the front wall 26a from the interior of the container housing 24. This may be advantageous in that the fluid flow urges the filter element 28 against the respective wall to facilitate sealing.

In FIG. 4b the depth D and the width W of the housing of the filter device 20 as well as the height $H_f$ of the filter element 28 and the overall height $H_h$ of the container housing are shown.

Figure 4C:
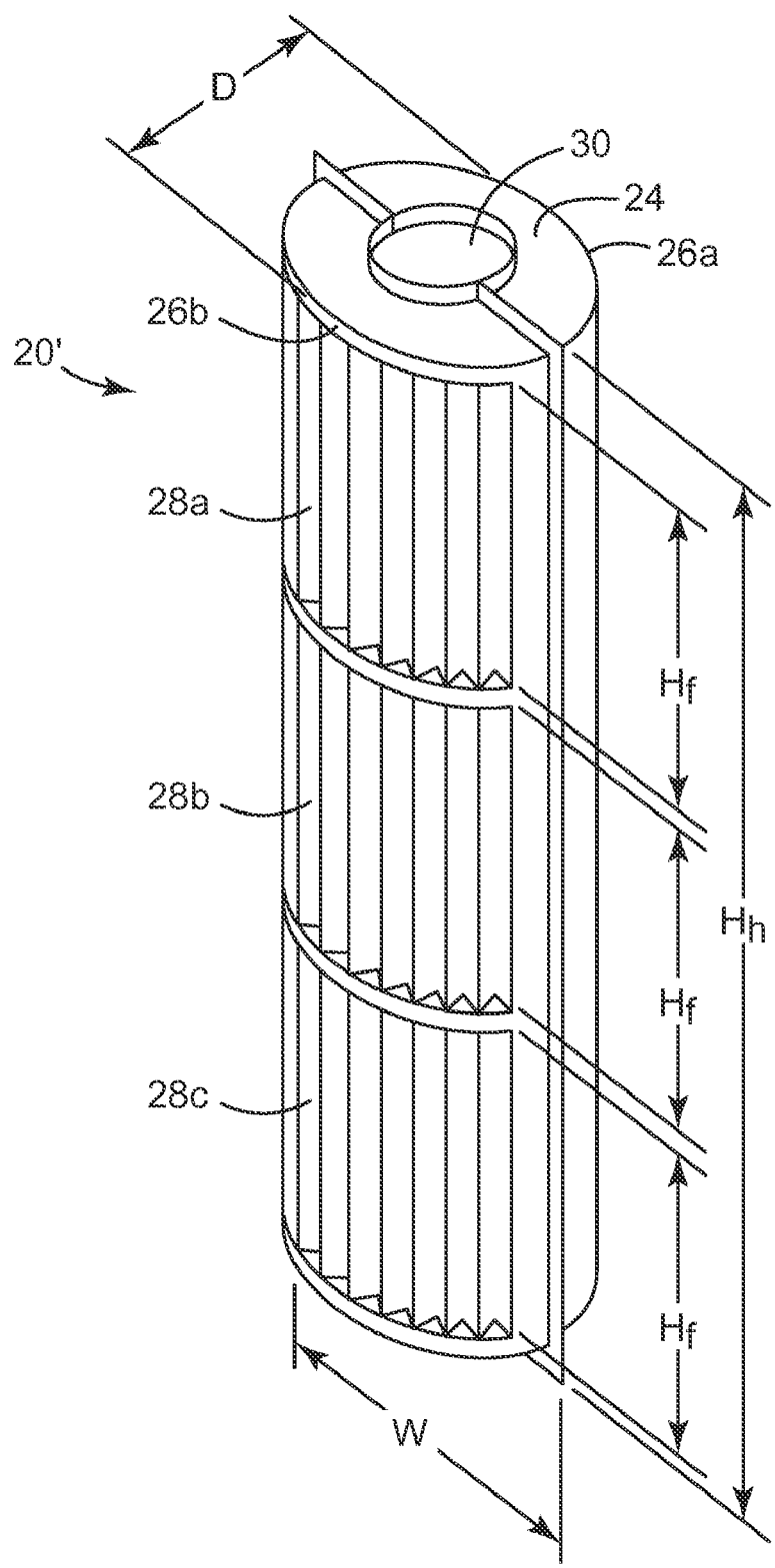

FIG. 4c shows a filter device 20' in which the housing 24 has an elongate shape with a total height $H_h$, and three filter elements 28a, 28b and 28c each having a height $H_f$ arranged on top of each other.

Tables 1a and 1b show typical dimensions of filter device 20, 20' for typical flow regimes, i.e., typical fluid flows through the filter device of the invention. For filter devices with a circular cross-section the depth D of the housing is typically about twice the filter radius. For example, a circular filter having a radius of 490 mm may be provided in a housing with a depth of 980 mm.

TABLE 1a

| Typical filter radius Mm | D mm | W Mm | $H_f$ mm | $H_h$ mm | Typical flow regime l/s |
|---|---|---|---|---|---|
| 490 | 100-490 | 600-700 | 270 | 300-700 | 50-250 |
| 410 | 90-410 | 500-600 | 270 | 300-700 | 30-170 |
| 310 | 70-310 | 350-500 | 270 | 300-700 | 20-100 |
| 200 | 60-200 | 250-400 | 270 | 300-700 | 10-50 |

TABLE 1b

| Typical filter radius mm | D mm | W Mm | $H_f$ mm | $H_h$ mm | Typical flow regime l/s |
|---|---|---|---|---|---|
| 490 | 100-490 | 600-700 | 270 | 900-1300 | 50-250 |
| 410 | 90-410 | 500-600 | 270 | 900-1300 | 30-170 |
| 310 | 70-310 | 350-500 | 270 | 900-1300 | 20-100 |
| 200 | 60-200 | 250-400 | 270 | 900-1300 | 10-50 |

The thickness of the material of the container 24 is preferably within the range of between 0.5 to 2.5 mm, preferably about 1 to 1.5 mm. In order to enhance the rigidity of the container, the front wall 26b and/or the rear wall 26a may be structured by ribs or similar stiffening elements that increase the rigidity of the container while keeping the weight and necessary amount of material at a minimum.

As illustrated in FIGS. 4a to 4c, the opening 30 and the filter element 28 are arranged in the container 24 so that the fluid flow into and out of the filter device 20 is substantially non-parallel. More precisely, the angle defined between the fluid flow into the filter device 20 through opening 30 and the fluid flow out of the device 20 through filter element 28 is about 70 to 110°, preferably about 90°.

Generally, it is advantageous to use plastic material for manufacturing the filter housing 24 because it can be easily and cheaply processed on the one hand, and is advantageous from a viewpoint of disposability of the filter device after the use on the other hand. The two blister-type container parts 26a and 26b are typically made by vacuum forming and are finally glued, welded, clamped, clipped and/or clicked together so as to insure a stable connection between the rear wall 26a and the front wall 26b. To this end, each of the container parts 26a and 26b may be provided with a flange portion 90a and 90b along which the parts 26a and 26b are connected with one another. This is one example for connecting the rear wall 26a and front wall 26b; however, any other suitable means that provides a stable and fluid-tight connection can alternatively be used. For example, when clicked or clipped together, the air-tightness of the connection can be established by a sealing film. It is also possible to use combined connection techniques, e.g. a click-connection in combination with an adhesive (cold glue or hot-melt adhesive). Alternatively, the two parts may be connected to one another by high-frequency welding or by use of an adhesive tape. Such a construction of the housing using two parts 26a, 26b provides sufficient rigidity to blister the housing even if the two parts themselves are thin and fairly flexible.

Instead of the shown semi-circular shape of the housing, it could also be provided as quarter-round or with a semi-circular front wall only, or with a plain front wall. Also a completely circular configuration is possible in accordance with the present invention. In case of a curved front wall, the curvature can be inwards or outwards, i.e. concave or convex. Such a configuration is advantageous since in combination with a pleated filter element a nozzle effect of the fluid flow can be achieved. Furthermore, the part of the housing carrying the filter elements can be divided into segments so that a plurality of filter elements may be provided on the filter device. One advantage of such a division of the housing into parts is that it allows identical filters with identical shapes and dimensions to be used so that production costs are optimised. For example, a typical blister-type housing may have three filter cut-outs, wherein, depending on the required flow rate, only one, two or all of them are occupied with filter elements and the remaining ones are closed by an appropriate cap or cover to prevent fluid to pass. In doing so the flow and performance regimes can be maximised for one and the same housing to be made. For example, a housing provided with only one filter element would be adequate for a flow rate of 50 l/s whereas the same housing provided with three filter elements would be adequate for a flow rate of about 150 l/s. Another way to optimise the use of such a housing is to change the filtering performance by changing the number of filters and/or the filter class of the inserted filter element. For example, by providing the housing with one filter element at 50 l/s, a performance level of 85% effectiveness could be reached, whereas by using three or more filters at the same flow rate of 50 l/s the performance level could be increased to 99.995% effectiveness.

Moreover, the individual sections in the housing 24 that can be provided with a filter element may help in optimising the flow distribution pattern of the filter device. For instance, if the fluid flow enters the housing substantially perpendicular to the position of the filter elements, an uneven flow distribution resulting in an uneven air velocity over the filter surface area may be encountered. By changing the pressure loss over the individual filter element (either by a higher or lower pressure loss over the individual filter media, a different pleat spacing, a different filter depth or other suitable means), the flow rate may be optimised and the air velocity over the entire filter device and housing surface area can be controlled. This is schematically illustrated in FIG. 6b, where the housing 24 is provided with three different filter elements 28a, 28b and 28c. The permeability of each of the filter elements 28a, 28b and 28c increases from the top to the bottom so that the flow resistance of each of the filter elements decreases from the top to the bottom so as to ultimately achieve an even flow distribution.

Alternatively, the housing 24 could be shaped in a specific way to optimise the air velocity and flow distribution pattern of the filter device. For example, the housing comprising the two blister parts 26a and 26b could be tapered in such a way that in an upstream portion of the housing the cross-section is wider, while in a downstream portion the cross-section is smaller. This is schematically shown in FIG. 6a. This could be done in one plane or in two planes, i.e., with a flat filter element or with a curved filter element.

Figure 5:
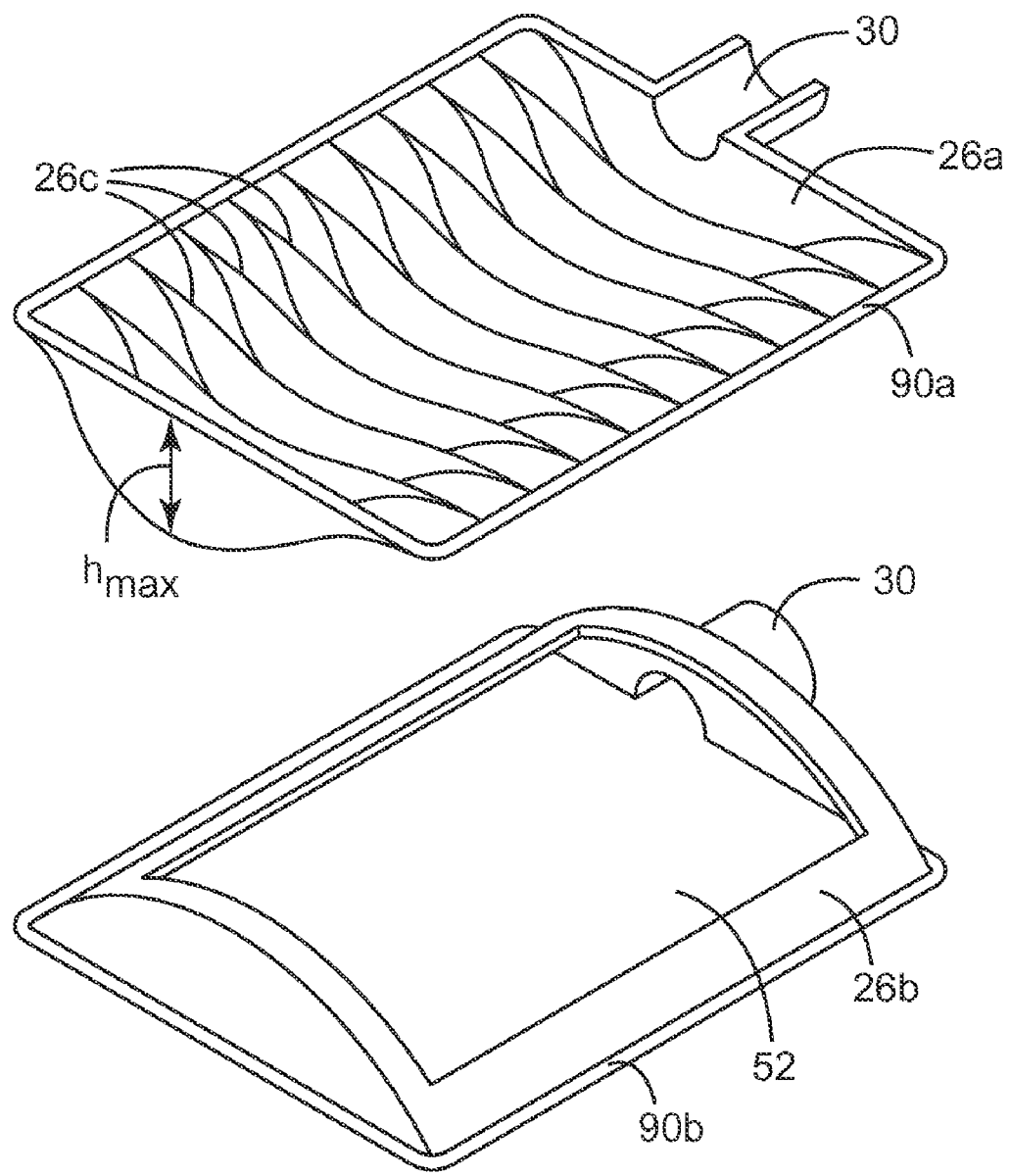
FIG. 5 is an isometric schematic illustration of another embodiment of a blister-type container for the filter device of the present invention.

In FIG. 5, a further alternative embodiment of a blister-type housing for the filter device of the present invention is illustrated. Generally, the housing is similar to that described with respect to FIG. 4, however, the shape is not semi-circular, but the rear wall 26a has rather a wave form with reinforcement ribs 26c, while the front wall 26b has a cross-sectional shape of a segment of a circle. The wave form of the rear wall 26 when viewed in the cross-section is considered particularly advantageous regarding the flow characteristics of the fluid to be filtered. More precisely, in the region where the opening 30 is located in the container 24, the height h of the container is at a maximum while it decreases towards the lateral ends thereof. Consequently, an even flow distribution pattern can be achieved.

FIGS. 7a and 7b show transition sections or flange pieces 23 between the fluid duct 22 and the container 24, with the fluid flow indicated by arrows. FIG. 7a shows a normal transition whereas FIG. 7b shows a conical transition section or flange 23. The transition section 23 has a height Ht and may be a separate part or may be an integral part of the container 24. A conical transition section 23 may be advantageous if a sufficiently large fluid duct 22 is required because large fluid amounts need to be transported through the duct, thus requiring a large cross-section of the duct, and/or the space for providing the housing 24 is limited, e.g., because of other equipment present in the respective area. The conical transition section 23 allows substantially undisturbed or laminar fluid flow, as shown by the arrows in FIG. 7b. The transition section or transition member 23 may include means for closing the filter device when it is removed from the fluid duct.

Housing Material

The housing is preferably made of a thermoplastic material or amorphous synthetic polymers, e.g., polyethylene terephthalate (PET) or polyethylene (PE), polyvinylchloride (PVC), polystyrene (PS), polymethylmethacrylate (PMMA), polycarbonate (PC) or acrylonitrile-butadiene-styrene-terpolymer (ABS) with or without filling material as well as combinations thereof. Examples for fillers are inorganic matters like titan-dioxide, calcium carbonate, carbon black etc. to make the materials cheaper and stronger.

Manufacturing Process

In order to provide a disposable filter device that can be completely disposed, i.e. both the container and the filter element, it is advantageous to use inexpensive materials and economic manufacturing processes. Typically, thermoforming processes, like vacuum-forming or blow-forming processes are preferred. In such processes, the raw material such as PET is extruded to be provided in the form of a flat sheet or web. These sheets are then used in a vacuum forming process.

In accordance with the present invention, both the front and rear wall of the container are preferably manufactured by way of vacuum-forming as is generally known for producing blister-type elements. In order to provide the at least one opening in the container which later carries the filter element(s), the produced wall element may undergo a machining action, such as milling, cold or hot die cutting using a die and an anvil or any other cutting operation. Alternatively, the opening(s) can also be produced during the molding or forming process, although this is considered to be less cost efficient.

Alternatively, an injection moulding process can be used for manufacturing the housing.

Preparation of the Filter Element

The filter material can generally be of any suitable shape and size, while a plane or pleated filter element is typically preferred. In particular, a pleated filter element is advantageous in that by pleating the filter material the filter surface area is considerably increased, while at the same time the pressure drop can be decreased. Furthermore, it is advantageous to include in the filter material electrostatically charged fibres. Generally, all filter materials are suitable that fulfil the ultra-low penetration air (ULPA), high efficiency particulate air (HEPA) and/or fine filter class standards and/or have the same or a higher filter class than the material used in the AHU.

Particularly suitable filter materials are filter products of polypropylene (PP), which can, however, generally not be used without a supporting structure or substrate. These substrates can be of any suitable material or material composites. For example, a polypropylene based blown micro fiber (BMF) can be prepared by using a known process, e.g., as described in WO 95/05232, U.S. Pat. Nos. 5,230,800 and 5,792,242. Further filter materials are described, e.g., in EP 1 068 889 A1 and U.S. Pat. No. 6,261,342.

Figure 8:
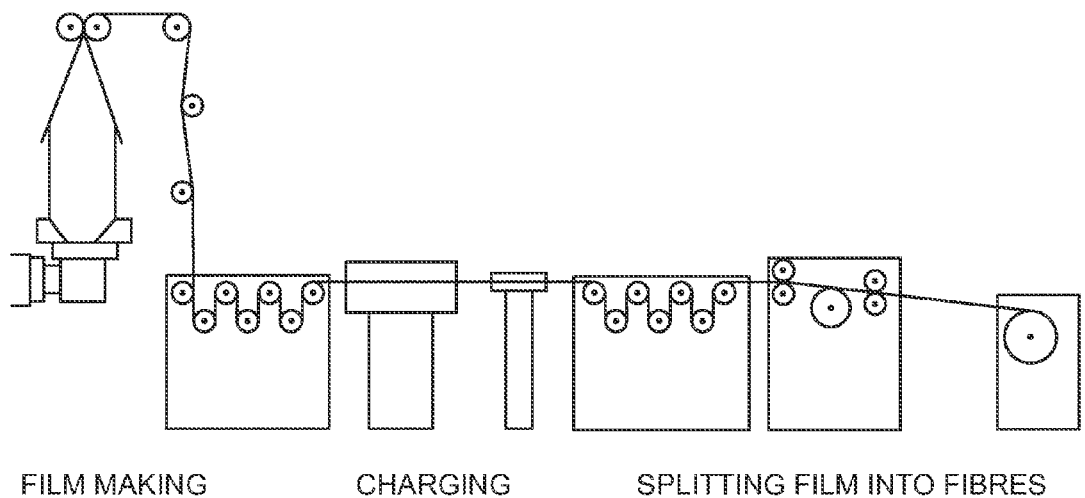
FIGS. 8 and 9 are schematic illustrations for an exemplary manufacturing process for a split fiber filter material.
Figure 9:
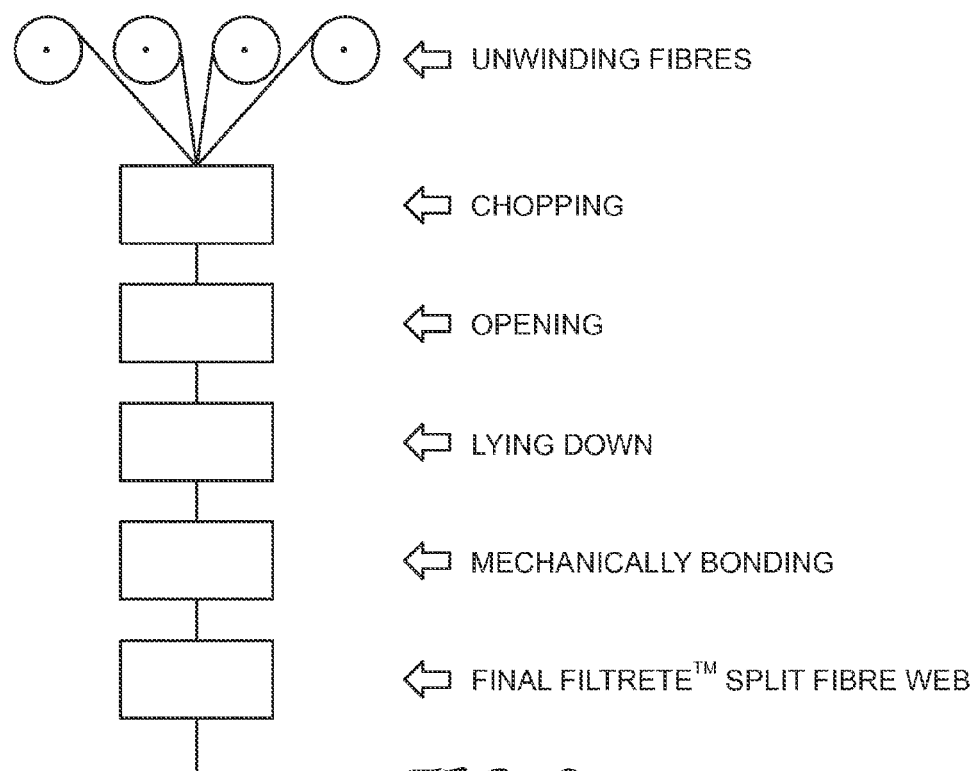
Figure 10:
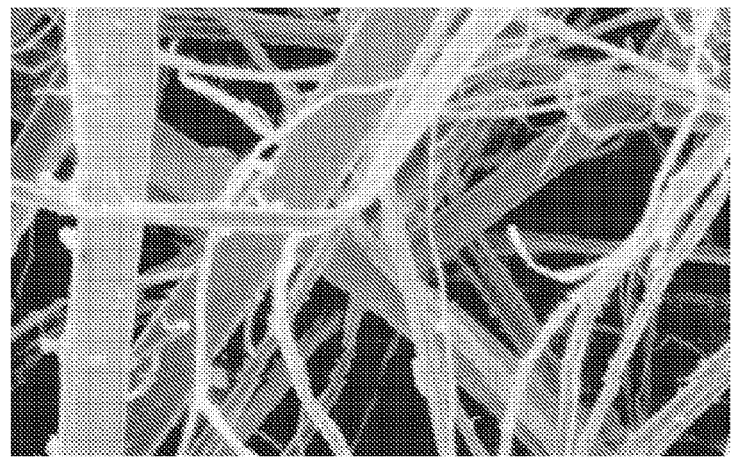
FIG. 10 is a microscopic picture of a split fibre filter material manufactured in accordance with the process shown in FIGS. 8 and 9.

An exemplary manufacturing process for the production of a split-fiber filter is illustrated in FIGS. 8 and 9. As shown in FIG. 8, initially a film is made from the material which is afterwards electrically charged and split into fibers. The fibers are eventually stored on a roll. As schematically shown in FIG. 9, the fibers are then unwound from a plurality of rolls and subsequently chopped, opened and laid down as well as mechanically bonded so as to provide a split-fiber web, e.g., a Filtrate™ split-fiber web available from Minnesota Mining and Manufacturing Company, St. Paul, Minn., USA. This production process results in fine rectangular fibres with very high charge density. In FIG. 10, a microscopic picture of such a split-fiber web is shown.

Figure 11:
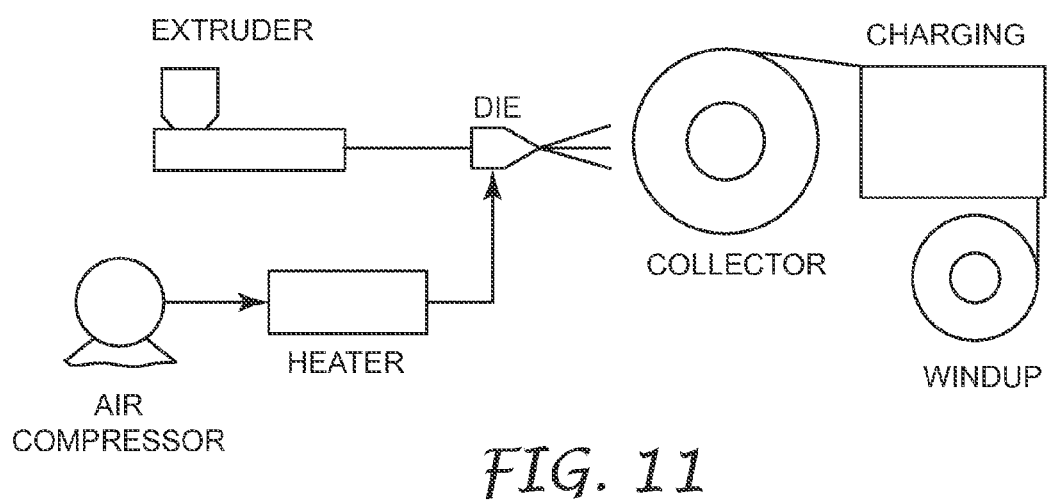
FIG. 11 is a schematic illustration of a manufacturing process for a HEPA blown micro fiber filter material.
Figure 12:
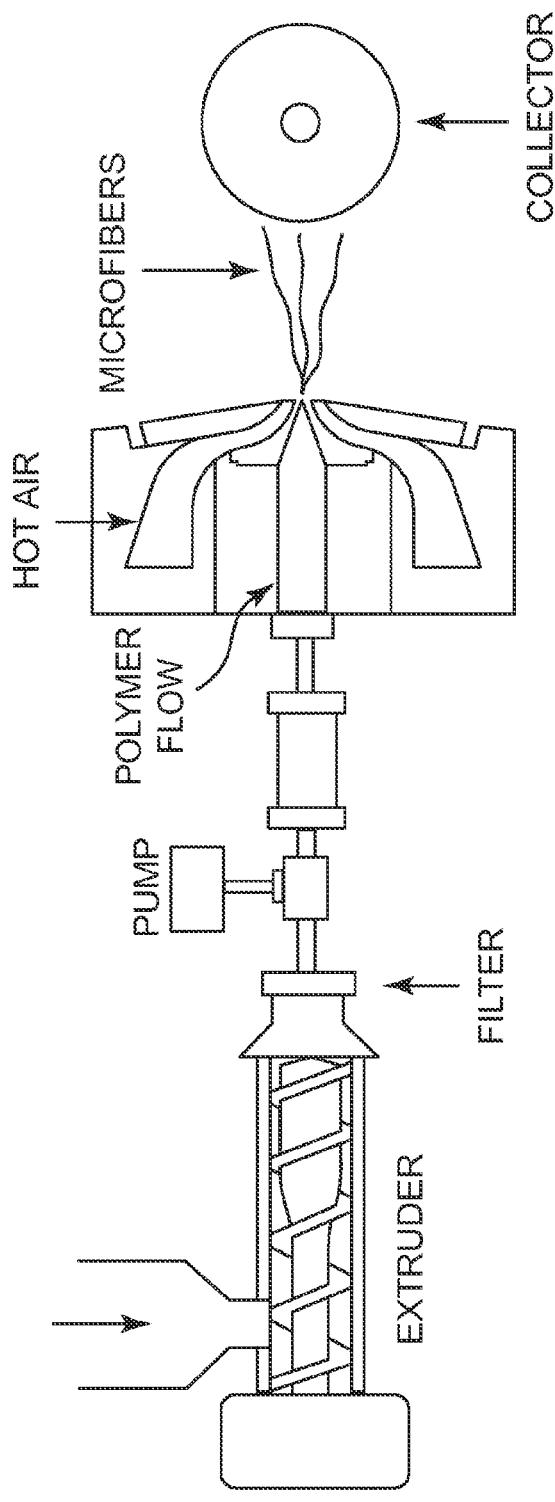
FIG. 12 is a more detailed illustration of a manufacturing stage of the process shown in FIG. 11.
Figure 13:
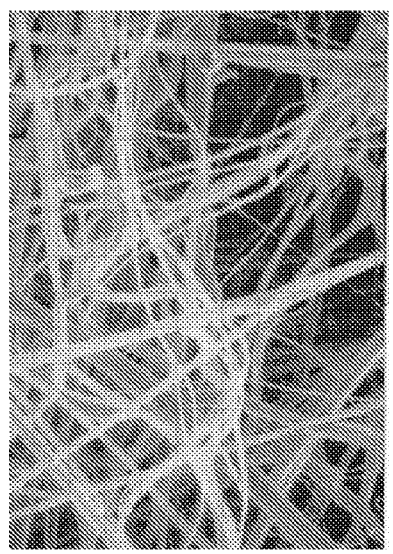
FIG. 13 is a microscopic picture of a blown micro fibre manufactured with the process of FIG. 11.

An alternative filter element that is particularly preferred for the filter device of the present invention is a HEPA filter element made from blown micro fibers. An exemplary manufacturing process for such filter materials is illustrated in FIGS. 11 and 12. As can be seen in FIG. 11, the melt blown process is a one-step non-woven process in which high-velocity, high-temperature air blows a molten thermoplastic resin from an extruder die tip to form a very fine-fibered, self-bonding web. More precisely, the extruder delivers the thermoplastic resin to the die to which compressed pre-heated air is delivered in order to form finely divided fibers that are collected on a collector and bonded thereon to form a web. The web may be charged and wound up on a roll as indicated in FIG. 11. A more detailed view of the extruder and the die is shown in FIG. 12. The resin is supplied via the extruder and a filter to the die where the fiber diameter is reduced by means of the hot air to a diameter of about 1 to 15 μm, i.e. by a factor of 105. These melt blown fibers are then collected on a collector drum and provided as a web to a charging and winding station where the produced filter material is stored. A microscopic picture of the accordingly produced filter material is illustrated in FIG. 13. As can be seen in this figure, the blown micro fibers that were manufactured in accordance with the process illustrated in FIGS. 11 and 12 are fine and round and are typically highly charged.

The present invention is based on the concept of a low cost filter device, i.e., housing and filter element, that can be discarded completely rather than only the filter element without substantially increasing the maintenance cost of an air terminal device. The device of the present invention ensures a safer and more reliable fluid filtration since no impurities and contaminants can escape from the filter device upon filter removal or replacement. The filter device is completely closed and no contaminants can fall off the filter element so that previously unavoidable inadvertent contamination can be avoided.

The invention claimed is:

1. A filter device adapted for filtering fluids flowing one of into or out of a fluid duct, said filter device comprising a container having one or more walls, at least one of said walls being at least partially rigid and comprising a first opening and a filter element mounted in said first opening so that said filter element forms at least a portion of one of said walls, said filter element comprising an interior face and an exterior face, the one or more container walls and the interior face of said filter element defining an interior adapted for collecting contaminants contained in a fluid flowing out of said fluid duct, and the container comprising a second opening adapted for sealingly and removably connecting said filter device to said fluid duct so as to provide fluid communication between the interior of said filter device and said fluid duct, said filter device permitting direct contact between a fluid to be filtered and one of the interior face or the exterior face of said filter element depending on the direction of fluid flow, and said second opening further adapted for being closed when said filter device is removed from said fluid duct.

2. The filter device according to claim 1, wherein said second opening and the filter element are arranged in the container such that the fluid flow into the filter device and the fluid flow out of the filter device are substantially non-parallel.

3. The filter device according to claim 2, wherein an angle defined between the fluid flow into the filter device and the fluid flow out of the filter device is about 70° to 110°.

4. The filter device according to claim 3, wherein the angle is about 90°.

5. The filter device according to claim 1, wherein the filter element covers substantially the entire circumference of the container.

6. The filter device according to claim 1, comprising a lid which is releasably securable to the container for covering the filter element.

7. The filter device according to claim 1, wherein said second opening further comprises means for closing said opening when said filter device is removed from said fluid duct.

8. A filter device adapted for filtering fluids flowing one of into or out of a fluid duct, said filter device comprising a container formed of first and second integral parts sealingly joined together, said container comprising at least one cut-out first opening and a filter element mounted in said cut-out, and a second opening for fluid communication with said fluid duct, said second opening being one of an inlet opening or an outlet opening, and said second opening having a first portion that is at least partially defined by the first integral part and a second portion that is at least partially defined by the second integral part.

9. The filter device according to claim 8, wherein the container is generally in the form of a blister package.

10. The filter device according to claim 8, wherein said second opening further comprises means for closing said opening when said filter device is removed from said fluid duct.

11. The filter device according to claim 8, wherein said second opening and the filter element are arranged in the container such that the fluid flow into the filter device and the fluid flow out of the filter device are substantially non-parallel.

12. The filter device according to claim 11, wherein an angle defined between the fluid flow into the filter device and the fluid flow out of the filter device is about 70° to 110°.

13. The filter device according to claim 12, wherein the angle is about 90°.

14. A method for replacing a filter device comprising a container having at least one wall that is at least partially rigid, wherein the wall comprises a first opening and a filter element mounted in said first opening, and wherein the container comprises a second opening for connection to a fluid duct, the method comprising the steps of:

(a) disconnecting the filter device from the fluid duct;
(b) closing the second opening with a closing means;
(c) removing the filter device;
(d) providing a new filter device, the new filter device also comprising a container having at least one wall that is at least partially rigid, wherein the wall comprises a first opening and a filter element mounted in said first opening, and wherein the container comprises a second opening for connection to the fluid duct; and
(e) connecting the second opening of the new filter device with the fluid duct.

15. The method of claim 14, further comprising the step of covering the outside of the element with a cover element prior to removing the used filter device.

* * * * *

UNITED STATES PATENT AND TRADEMARK OFFICE
CERTIFICATE OF CORRECTION

PATENT NO. : 7,320,719 B2
APPLICATION NO. : 10/504494
DATED : January 22, 2008
INVENTOR(S) : Peter Van De Graaf et al.

It is certified that error appears in the above-identified patent and that said Letters Patent is hereby corrected as shown below:

Column 1
First Page, Title, Line 1, insert -- , -- following "DEVICE".
Line 1, insert -- , -- following "DEVICE".

Column 2
Line 35, delete "recalculation" and insert -- recirculation -- in place thereof.

Column 4
Line 13, insert -- . -- following "element".

Column 5
Line 8, insert -- . -- following "element".
Line 64, delete "i.a.," and insert -- i.e., -- in place thereof.

Column 6
Line 48, insert -- . -- following "sheet".
Lines 48-58 After "sheet" delete "Generally, …….
……. the web." and insert the same on Line 49 as a new paragraph.

Column 11
Line 20, insert -- . -- following "duct".

Column 14
Line 65, delete "Filtrate$^{TM}$" and insert -- Filtrete$^{TM}$ -- in place thereof.

UNITED STATES PATENT AND TRADEMARK OFFICE
CERTIFICATE OF CORRECTION

PATENT NO. : 7,320,719 B2  
APPLICATION NO. : 10/504494  
DATED : January 22, 2008  
INVENTOR(S) : Peter Van De Graaf et al.

Page 2 of 2

It is certified that error appears in the above-identified patent and that said Letters Patent is hereby corrected as shown below:

Column 15  
Line 36, insert -- . -- following "replacement".  
Line 20, delete "105" and insert -- $10^5$ -- in place thereof.

Column 16  
Line 64, Claim 15, insert -- filter -- following "of the".

Signed and Sealed this

Twenty-fourth Day of June, 2008

JON W. DUDAS  
*Director of the United States Patent and Trademark Office*